Figure 1:
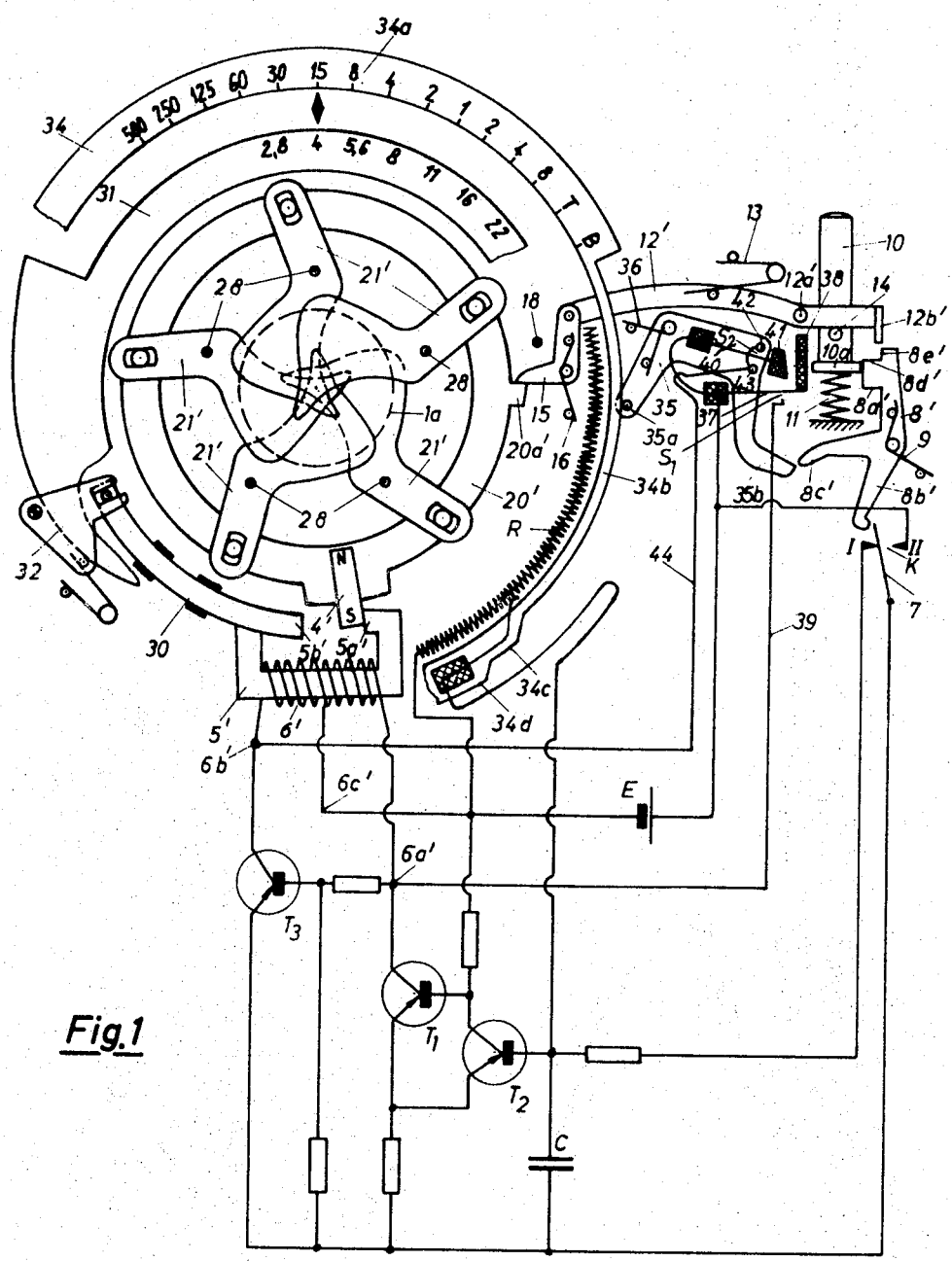

United States Patent

[11] 3,533,345

[72] Inventor Franz W. R. Starp
 Calmbach, Black Forest, Germany
[21] Appl. No. 537,236
[22] Filed March 24, 1966
 Continuation-in-part of application Ser. No. 509,888, Nov. 26, 1965, now pending.
[45] Patented Oct. 13, 1970
[73] Assignee Prontor Week Alfred Gauthier G.m.b.H.
 Calmbach, Black Forest, Germany
 a corporation of Germany
[32] Priority March 25, 1965
[33] Germany
[31] 36,380

[54] PHOTOGRAPHIC CAMERA WITH RECIPROCATING SHUTTER BLADE SYSTEM
 6 Claims, 8 Drawing Figs.
[52] U.S. Cl..................................... 95/53, 95/63
[51] Int. Cl..................................... G03b 9/62
[50] Field of Search........................... 95/53, 63

[56] References Cited
 UNITED STATES PATENTS
 2,702,500 2/1955 DeBell..................... 95/58

FOREIGN PATENTS
1,159,261 12/1963 Germany................. 95/53E

Primary Examiner—John M. Horan
Attorney—Arthur A. March

ABSTRACT: A photographic camera is provided having a shutter blade system that covers the lens aperture and executes a reciprocating motion during the exposure process. A permanent magnet is situated on the shutter blade system and participates in the motion of the shutter blade system. An electromagnet is associated with the permanent magnet, the polarity of the electro magnet being reversable by means of an electronic timing and switching circuit. This circuit has a contact switch for energizing the electro magnet, and a push buttom for releasing the camera and operating the contact switch. In addition a switching device is provided for carrying out B and T exposures; the switching device cooperating with the push button serves to release the camera and is movable to selected operating positions. A power source for energizing the electro magnet is provided; the electro magnet being connected to the power source only for the duration of time required for the opening and closing motion of the shutter blade system after operation of the push button.

INVENTOR
Franz W. R. Starp
BY
Arthur A. March
ATTORNEY 3,533,345

1

PHOTOGRAPHIC CAMERA WITH RECIPROCATING SHUTTER BLADE SYSTEM

The present invention is a continuation-in-part of U.S. Pat. application Ser. No. 509,888 filed Nov. 26, 1965 (German Pat. application G 42,139), and relates to a photographic camera, whose shutter blade system covering the lens aperture, executes a reciprocating motion during the exposure process.

In accordance with the parent patent, a permanent magnet is situated on the shutter blade system and participates in the motion of the latter. An electromagnet, whose polarity can be reversed by means of an electronic switching circuit, is associated with the permanent magnet so that one of the poles of the permanent magnet projects into the electromagnet. This allows the transfer of the shutter blade system into the open and closed position, through magnetic forces exclusively. Accordingly, this arrangement dispenses with mechanical transmission members.

Another embodiment of the parent patent provides that the electronic timing circuit have a contact switch designed to energize the electromagnet. The switch is operable either directly by means of a push button serving to release the camera, or by means of a contact lever following the motion of the push button due to the action of a spring.

The present invention is a further improvement of the subject matter of the parent patent. It is the object of the present invention to improve the shutter arrangement, while retaining the advantages resulting from the invention of the parent patent. It is the specific object of the present invention to make the camera usable for carrying out not only exposures automatically controlled by the electronic timing circuit, but also "B" exposures and/or "T" exposures.

Another object of the present invention is to provide for less drainage of the power source.

The invention accomplishes these objects essentially through a switch arrangement for carrying out "B" exposures and/or "T" exposures. The switching device which can be selectively moved into the operating position, cooperates with the push button, serving to release the camera. The arrangement is such that when the push button is operated in the appropriate manner, the electromagnet is connected briefly to the energizing source. This latter connection is made only for the duration of time required for the opening and closing motion of the shutter blade system. In this manner, it is possible to impart to the electromagnetic shutter drive the pulse for closing the shutter, through the electronic timing circuit as well as through the photographer himself. Accordingly, the shutter allows the taking of photographs with automatically controlled exposure time and, in addition, "B" exposures and/or "T" exposures as desired.

A preferred embodiment of the invention provides that the switch arrangement comprise a control member which can be acted upon by an exposure time setting member. When the camera is switched to the "B" or "T" position, the control member releases the switch arrangement which alternately connects the electromagnet to the power source. At the same time, the control member separates the electronic timing circuit from the power source for the duration that the "B" exposures or "T" exposures are carried out.

This assures a convenient procedure for operating the camera, because it is merely necessary to convey the exposure time setting member into the corresponding position. This arrangement, moreover, results in quick and dependable operation of the electromagnetic shutter drive for "B" and "T" exposures. This results from the electromagnet being connected in this case directly to the power source.

In order that the electronic timing circuit be inoperative during "B" exposures or "T" exposures, another feature of the invention provides that the control member be in the form of a control lever associated with a contact lever. The latter acts on the contact switch of the electronic timing circuit when the push button is actuated, and severs the coupling between the button and the switch arrangement. The contact lever can be

2 conveyed into a position in which it is inoperative with respect to the push button and contact switch.

When carrying out "B" exposures or "T" exposures, unnecessary drainage of the power source can be avoided in a simple and effective manner, if the switch arrangement is actuated, in the inoperative position of the contact lever, by a projection of a connecting rod. Accordingly such a connecting rod is provided, and one end of the latter rest on a projection of the push button due to the action of a spring. The other end of the connecting rod is articulately connected to an angle lever which abuts against the shutter blade system through means of a spring.

Another embodiment of the invention provides that the switch arrangement comprises two switches each electrically connected, on the one hand, to the power source and, on the other hand, to the electromagnet. The two switches are actuated alternately by the push button.

A switch arrangement for carrying out "B" exposures and "T" exposures, which is of simple construction and assures a maximum reliability of operation, can be realized with the invention. Thus, one switch is fixed, and the second switch is situated on the control lever and can be conveyed into two positions relative to the first switch. In one relative direction, the two switches can be influenced in the same direction, by means of the projection of the connecting rod. In the other relative position, they can be influenced in opposite direction. On the other hand, it is also possible to carry out, "B" or "T" exposures in addition to exposures controlled by the electronic timing circuit. In this connection, the invention provides that the two switches be fixed, and that the actuating member of one of the two switches is oriented with respect to the actuating member of the other switch, so that it is possible to influence the two switches alternately either in the same direction or in opposite directions by the projection of the connecting rod.

Figure 2:
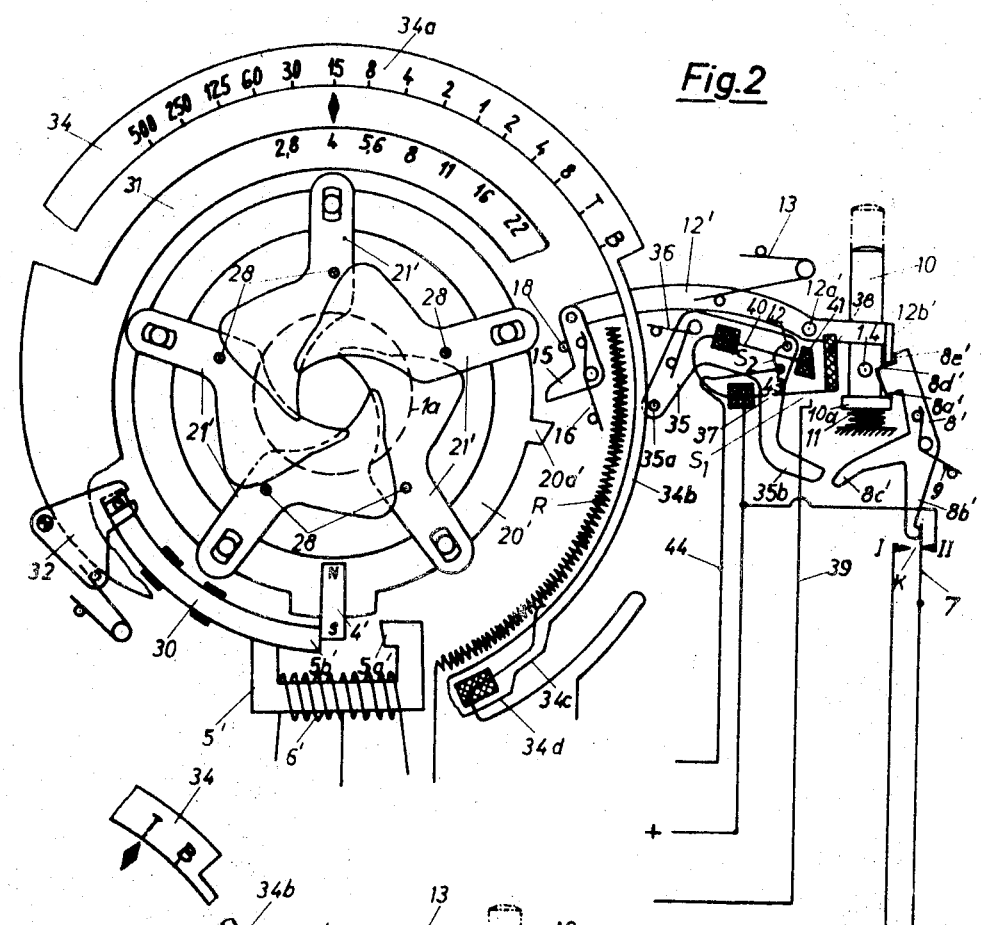
Figure 3:
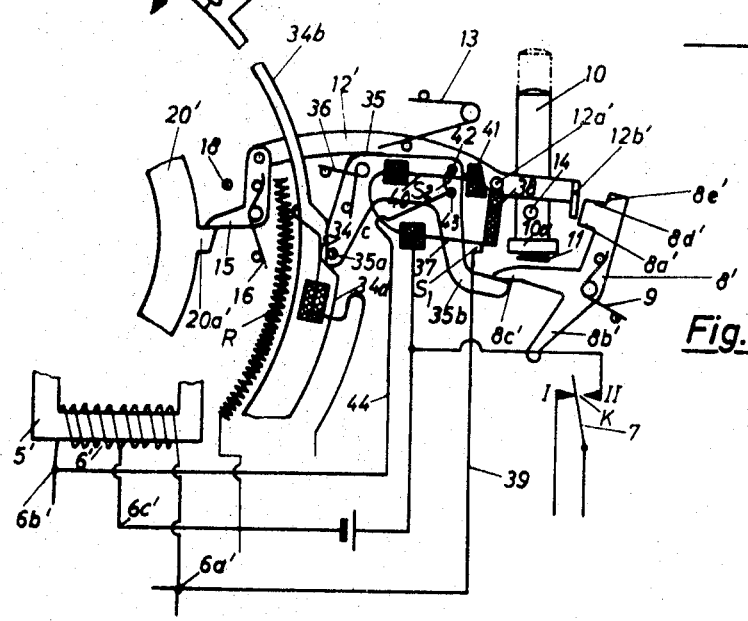
Figure 4:
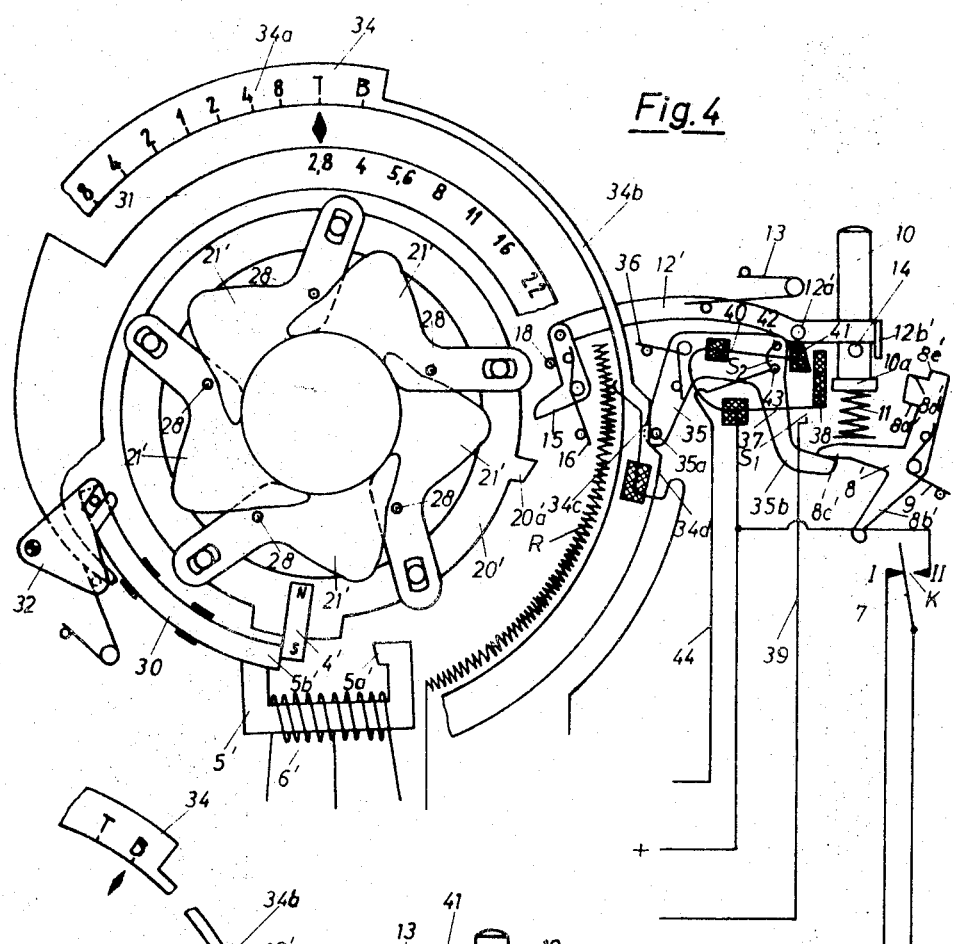
Figure 5:
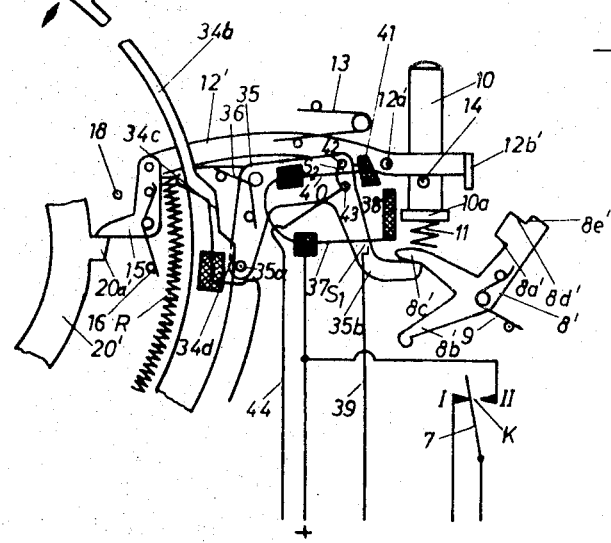
Figure 6:
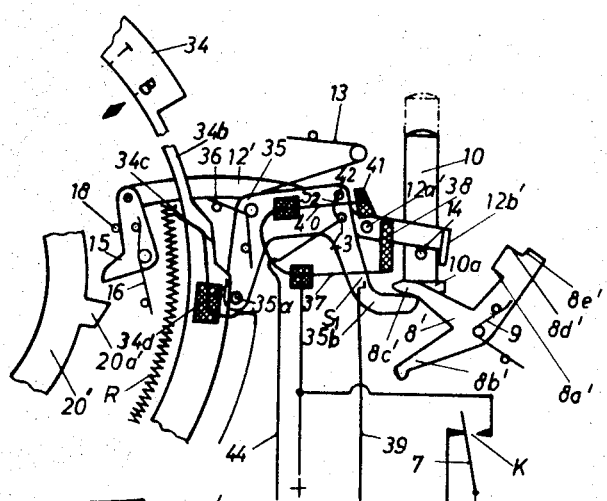
Figure 7:
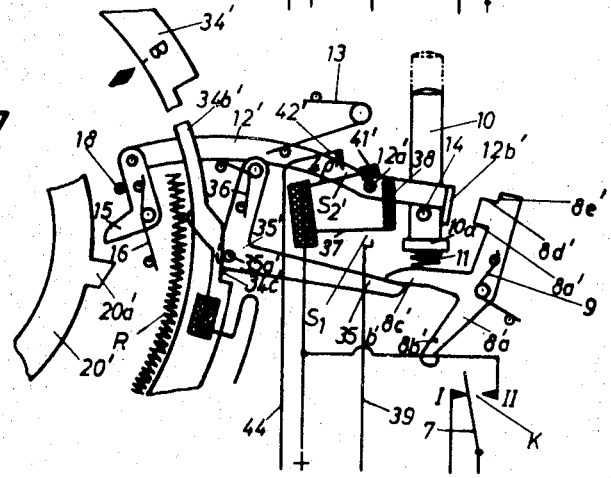
Figure 8:
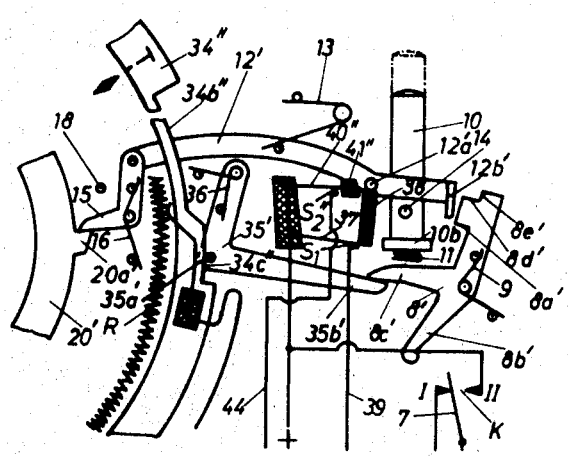

Several embodiments of the invention are described below with reference to the accompanying drawing, in which:

FIG. 1 is a diagrammatic view of a shutter with its electromagnetic drive system in the inoperative position. The shutter can be controlled either automatically by an electronic circuit or by a manual actuating device designed for carrying out "B" and "T" exposures, FIG. 2 shows the shutter of FIG. 1 in the open position, FIG. 3 is a sectional view of the shutter, and shows the actuating device conveyed into the "T" setting position, just prior to the starting of the shutter blade actuating ring, FIG. 4 shows the shutter set in the open position according to the view of FIG. 3, with the release button having returned to the inoperative position, FIG. 5 shows a member of the shutter in relation to the actuating device which has been reversed for carrying out "B" exposures, and which is in the starting position, FIG. 6 shows the actuating device set to an intermediate position according to FIG. 5, with the shutter having reached the open position and the release button being held depressed, FIG. 7 shows a variation of the actuating device illustrated in FIGS. 1 through 6. The device is for manual control of the electromagnetic drive system for carrying out "B" exposures in the intermediate position of FIG. 6, FIG. 8 shows, analogous to the arrangement of FIG. 7, an actuating device which permits carrying out "T" exposures, after the release but just prior to the starting of the shutter.

In accordance with the drawing, as well as the parent patent (U.S. Pat. application Ser. No. 509,888) $1a$ is the lens aperture of the base plate (not shown) of a photographic shutter. The aperture is covered or masked by several as for example, five shutter blades $21'$, when the shutter is in the closed position. Each shutter blade $21'$ is positioned on a fixed pin 28. The drive of the shutter blades $21'$ is obtained through the driving ring $20'$ which, in turn, carries the permanent bar magnet $4'$. Associated with this permanent magnet is the fixed electromagnet $5'-6'$, the coil of which has the terminals $6a'$ and $6b'$, as well as the center tap $6c'$.

The free end of the permanent magnet 4' designated as the south pole, may travel back and forth between the poles 5a' and 5b' of the electromagnet 5'–6'. This end of magnet 4' engages the pole 5a' when the shutter is in the closed position, while it engages the pole 5b' when the shutter is in the open position. The position of pole 5b' may be variable with respect to its counterpole 5a'. Pole 5b' may be constructed in the form of yoke 30. This arrangement makes it possible to vary the angle of swing of the permanent magnet 4', and thereby the movement of shutter blades 21' out of the closing position. In this manner the size of the diaphragm can be set simultaneously by means of the shutter blades. In this connection, yoke 30 is slidably positioned within fixed guides (not shown in the drawing). The yoke can be moved by means of a diaphragm setting member 31 through the cam-controlled, two-arm lever 32.

For the purpose of automatically controlling the drive system consisting of permanent magnet 4' and electromagnet 5'–6' the terminals 6a', 6b' and 6c' are connected, just as in the arrangement according to the Main Patent, to an electronic timing circuit. The circuit can be connected to the source of energy E by means of the contact switch K.

The arrangement is similar to that of the parent patent. Components of the timing circuit are the adjustable resistor R, the capacitor C, as well as a plurality of transistors $T_1$, $T_2$ and $T_3$. Connected in series with the contact switch K, is the transistor $T_1$ as well as the winding 6a'–6c' of magnet coil 6'. The capacitor C connected to transistor $T_2$, and the resistor R, are arranged in a circuit which forms a time delay circuit.

The ohmic value of the resistor R can be varied by means of the time setting member 34 for obtaining different exposure times. Connected in parallel with the circuit containing the RC combination, is the transistor $T_3$ whose collector is connected to terminal 6b'. The terminal 6c' engages directly the negative pole of the power source. The other resistors, not referenced in the wiring diagram, serve to complete the preceding electronic circuit. The switch K is actuated by the lever 8', which engages the collar 10a of push button 10 due to the action of spring 9. The push button 10 acted upon by spring 11, is locked in the release position shown in FIG. 2 by the edge 8a' of contact lever 8'.

In order to release the locked push button, the invention includes connecting rod 12' which is connected, at one end, to the angle lever 15. At the other end, rod 12' abuts against the pin 14 of push button 10. The angle lever 15, in turn, abuts, in the closed position of the shutter, against lug 20a' of the shutter blade actuating ring 20' due to the action of spring 16. In the opening phase of the shutter, lever 15 executes a counterclockwise rotary motion limited by the fixed pin 18.

In order to enable the photographer to use the shutter arrangements of the parent patent to obtain any desired exposure time, i.e., "T" exposures and/or "B" exposures, the invention provides a reversing and actuating device. This latter device is in addition to switch K, and allows the electronic circuit to be disconnected from the power source E. In this manner, the electromagnetic drive system can be controlled manually at will. Accordingly, exposure times other than those obtainable from the electronic timing circuit, may be realized. This device is essentially a control lever 35 which engages, within the setting range of the exposure time scale 34a, a concentric curved section 34b of the setting member 34. The control lever 35 also has an arm 35b which, upon the exposure time setting member 34 being conveyed into the "T" or "B" position, impinges on another arm 8c' of the contact lever 8'. Lever 8' is thus moved out of the path of the free end of connecting rod 12' by being rotated in clockwise direction.

Associated with the "T" and "B" setting positions is a control cam coupled to the curved section 34b of the exposure time setting member. This cam is of a step-like design. Upon the device being set to the "T" position (FIGS. 3 and 4), the pin 35a rides up the step 34c. On the other hand, the control lever 35 engages the curved section 34d when the device is in the "B" position (FIGS. 5 and 6). The connecting rod 12' acted on by the spring 13, carries an actuating pin 12a' which, after the contact lever 8' has pivoted out of the operating position, co-operates alternately with switch $S_1$ and switch $S_2$ arranged on lever 35. The switch $S_1$ has a contact spring 37 carrying at its free end an insulating member 38 which co-operates with the actuating pin 12a'. Moreover, switch $S_1$ is connected, on one side, with the positive pole of the power source E. The other side of $S_1$ is connected to the terminal 6a' of magnet coil 6', by way of line 39.

The switch $S_2$ has a contact spring 40 which is also connected to the positive pole of the power source E. The free end of $S_2$ carries an insulating member 41 provided with an inclined profile for engaging actuating pin 12a'. Associated with contact spring 40, are two pins 42 and 43 fixed to the control lever 35. These pins are electrically connected to each other and to terminal 6b' of the magnet coil 6', by way of line 44.

At its free end, the connecting rod 12' has a bent-up lug 12b'. Upon the time setting member 34 being set at one of the exposure times of scale 34a as in FIGS. 1 and 2, lug 12b' impinges, when push button 10 is depressed, on the edge 8d'. In this manner the actuation of the switches $S_1$ and $S_2$ by means of pin 12a' is prevented.

The shutter arrangement described above and illustrated in FIGS. 1 to 6, operates in the following manner:

If exposures of durations within the time scale 34a are to be carried out, the setting member 34 is set to the desired value as, for example, one-fifteenth second. The time constant of the RC-circuit, i.e., the ohmic value of the adjustable resistor R, is thereby determined. The control lever 35 engages the curved section 34b of member 34 and, therefore, exerts no influence upon contact lever 8'. If the shutter is in the form of a diaphragm shutter (as in the present case), the setting of the diaphragm by means of member 31 will determine directly the distance between the movable pole 5b' and the fixed pole 5a'. Thus, the swing of the shutter blades 21' is limited to a value based on the selected diaphragm.

If the push button 10 is actuated for the purpose of releasing the camera, it becomes locked in the release position shown in FIG. 2 due to the locking edge 8a'. At the same time, arm 7 of switch K is transferred from contact position I to position II through the lever arm 8b'. As a result, transistor $T_1$ conducts while the two transistors $T_2$ and $T_3$ are cut off. Therefore, current flows through the winding 6a'–6c', and generates a magnetic field in the electromagnet 5'–6'. This magnetic field is directed so that the permanent magnet 4' fixed to the shutter blade actuating ring 20', is repelled by pole 5a' and attracted by pole 5b'. During this process, the shutter blades 21' transfer from the closed position shown in FIG. 1, to the open position shown in FIG. 2. During the opening motion of ring 20', angle lever 15 disengages from lug 20a' and contacts pin 18 due to the action of the spring 16. The connecting rod 12' is thereby drawn to the left with respect to FIG. 1, and the lug 12a' falls on the edge 8d', as shown in FIG. 2.

When the push button 10 is actuated capacitor C starts to charge. The time required by the capacitor to become charged to the base voltage of transistor $T_2$, depends on the capacitance of the capacitor and on the ohmic value of resistor R. When the charge of capacitor C has reached the base voltage, transistor $T_2$ becomes conductive and, as a result, transistor $T_1$ is cut off. At the same time, transistor $T_3$ conducts. Consequently, in winding section 6b'–6c', current now flows in the direction opposite to that of the previous flow. The polarity of electromagnet 5'–6' is therefore changed, and the permanent magnet 4' is repelled by the pole 5b'. Accordingly, magnet 4' returns to the pole 5a' with the result that the shutter blades 21' transfer again to the closed position.

The locked push button 10 is released when the ring 20' returns to its starting position. Thus lug 20a' strikes against angle lever 15, and rotates latter against the action of spring 16. The connecting rod 12' is thereby moved to the right with respect to FIG. 2. so that lug 12b' strikes against edge 8e' of the contact lever 8' to pivot the latter clockwise. Contact switch K is opened again, and the electronic circuit is thereby interrupted. If the push button 10 is now released provided that this has not already been done, it returns, due to spring 11, to the starting position shown in FIG. 1. At the same time, the push button takes along the free end of connecting rod 12'. After the electric field has collapsed, magnet 4' continues to adhere to pole 5a' of electromagnet 5'–6' associated with the closed position of the shutter. The adherence of magnet 4' is additionally assisted by the residual field of the electromagnet.

If the preceding shutter arrangement is to be used for taking photographs with exposure times of any desired durations, i.e., "T" or "B" exposures, the setting member 34 must be transferred to the "T" or "B" positions. As shown in FIG. 3, the pin 35a rides up the cam 34c, and therefore control lever 35 is rotated counterclockwise out of its starting position. During this rotary motion, arm 35b of the control lever 35 strikes against the arm 8c', and moves the latter outside the path of lug 12b'. At the same time, arm 8b' is lifted off the arm 7 of switch K, causing the electronic circuit to remain inoperative when "T" and "B" exposures are carried out. When the time setting member 34 is transferred to the "T" position, switch S₂ is moved with respect to switch S₁ so that the contact arm 40 and attached insulating member 41 occupy the position shown in FIG. 4.

If push button 10 is now actuated, the free end of connecting rod 12' is able to follow the downward motion of the push button without being obstructed by the contact lever 8'. This downward motion proceeds until the actuating pin 12a' impinges on the insulating member 38, thereby closing switch S₁. Accordingly, current is able to flow from the power source E through the winding section 6a'–6c', by way of the switch S₁ and line 39. This current generates a magnetic field in electromagnetic 5'–6' in the same manner as it does when the electronic timing circuit is operated. The direction of this field is again such that magnet 4' is repelled by the pole 5a', and attracted by pole 5b'.

While the shutter blade actuating ring 20' transfers to the open position, angle lever 15 rotates in counterclockwise direction. In so doing, lever 15 pulls the connecting rod 12' to the left with respect to FIG. 3. However, this movement is only to the extent where the actuating pin 12a' engages the inclined face of the insulating member 41. If the push button 10 is now released, the pin 14 lifts the actuating pin 12a' off the insulating member 38 of switch S₁. At the same time, pin 14 guides actuating pin along the inclined face of the insulating member 41. This causes switch S₁ to be opened and the connecting rod to be transferred into the position shown in FIG. 4. In the latter position the actuating pin resides above the insulating member 41 of switch S₂. When switch S₁ is opened, the flow of current through the winding 6a'–6c' is discontinued, and therefore the magnetic field in electromagnet 5'–6' collapses. However, due to its own magnetic field, the permanent magnet 4' continues to adhere to pole 5b'. The shutter is thereby kept in the open position, as shown in FIG. 4.

To close the shutter, the push button 10 must be depressed again with the setting member 34 in the "T" position. Starting from the intermediate position illustrated in FIG. 4, the actuating pin 12a' impinges on the insulating member 41 of switch S₂, and causes contact arm 40 of this switch to engage contact pin 43. This causes current to flow through the power source contact arm 40, contact pin 43 and line 44, and through the winding section 6b'–6c'. As a result, a magnetic field is generated in electromagnet 5'–6' and imparts to magnet 4', a pulse for closing the shutter (due to the reversal of the field direction).

While the shutter blade actuating ring 20' returns to the initial position, angle lever 15 is forced into its normal position. The actuating pin 12a' is thereby located adjacent to the somewhat elastic insulating member 38. When the push button pin is released, switch S₂ opens and electromagnet 5'–6' becomes de-energized. The actuating pin 12a' becomes now located above the insulating member 38, and occupies again its initial position preparatory to the next exposure process.

If the camera is to be used to carry out "B" exposures, the photographer has to merely transfer the exposure time setting member 34 to the corresponding position. The control lever 35 is again pivoted in counterclockwise direction, and switch S₂ occupies thereby the position in relation to switch S₁ as illustrated in FIG. 5. The resulting additional movement of the contact lever 8' is of no consequence. Upon actuation of the push button pin, the switch S₁ is closed by means of pin 12a'. A pulse causing the opening of the shutter is, thereby, imparted to electromagnet 5'–6'. The permanent magnet 4' is thus repelled by pole 5a' and attracted to pole 5b'. This causes the shutter to be opened. With the subsequent motion of connecting rod 12' to the left, the actuating pin 12a' slides under the insulating member 41, as shown in FIG. 6. This takes place because the position of switch S₂ has changed with respect to the previous setting position. Accordingly, switch S₁ is opened, and the electromagnet is de-energized. As soon as push button 10 has been released, switch S₂ is closed, and actuating pin 12a' causes the switching arm 40 to engage contact pin 42. The electromagnet 5'–6' again receives an electrical pulse which causes the shutter to be transferred into the closed position. When angle lever 15 is returned to its initial position by the shutter blade actuating ring 20', the actuating pin 12a' slides under the insulating member 41 and moves to the right with respect to FIG. 6. The return of pin 12a' to its initial position is shown in FIG. 5. The switch S₂ is opened and the electromagnet 5'–6' is again de-energized.

The device shown in FIG. 7 allows the photographer to carry out solely "B" exposures, in addition to exposures controlled automatically by the electronic timing circuit. In the device shown in FIG. 7, the control lever is in the form of angle lever 35'. Upon the exposure time setting member 34' being set to the "B" position, lever 35' cooperates with the control cam 34c' to convey contact lever 8' into the non-operating position. The pulse for opening the shutter, is again released by means of the switch S₁ upon depression of push button 10. The current for closing the shutter is initiated by means of a fixed switch S₂, whose arm 40' is oriented so that actuating pin 12a' can slide under insulating member 41' during the leftward motion of connecting rod 12' following the opening of the shutter (FIG. 7). When push button 10 is released, the arm 40' engages the contact 42'. This causes a pulse for closing the shutter to be imparted to electromagnet 5'–6'. The device illustrated in FIG. 7, also assures that, after opening and closing of the shutter, the switches S₁ and S₂ are opened in response to the motion of the shutter blade actuating ring 20'.

Analogous to the arrangement of FIG. 7, the device illustrated in FIG. 8 allows the photographer to carry out solely "T" exposures, aside from exposures controlled by the electronic timing circuit. In this connection, the fixed switch S₂'' is arranged so that, after the release of push button 10 following its first actuation, pin 12a' can occupy the same position with respect to insulating member 41'', as shown in FIG. 4. When the exposure time setting member 34'' is transferred to the position "T", contact lever 8' is moved again out of the path of connecting rod 12', by means of the control lever 35'. The pulse for opening the shutter is obtained when the push button 10 is actuated for the first time by means of switch S₁. When push button 10 is actuated again, pin 12a' impinges on the insulating member 41'', and thereby closes the switch S₂''. As a result, current responsible for the closing process of the shutter, flows in electromagnet 5'–6'. The device of FIG. 8 also assures that switch S₁ or S₂'' can open again automatically after each release of the push button 10.

I claim:

1. A photographic camera having a shutter blade system covering the lens aperture and executing a reciprocating motion during the exposure process, a permanent magnet situated on said shutter blade system and participating in the motion of said shutter blade system, an electromagnet associated with said permanent magnet, the polarity of said electromagnet being reversible by means of an electronic timing and switching circuit comprising a contact switch for energizing said electromagnet, and a push button for releasing the camera and operating said contact switch, characterized by: a switching means for carrying out B exposures and T exposures, said switching means cooperating with said push button serving to release said camera and being movable to selected operating positions; and a power source for energizing said electromagnet, said electromagnet being connected to said power source only for the duration of time required for the opening and closing motion of said shutter blade system after operation of said push button and including an exposure time setting member and characterized in that said switching means comprises a control member associated with said exposure time setting member and releasing said switching means after said camera is switched to the B or T setting positions marked on said exposure time setting member, said switching means alternately connecting said electromagnet to said power source and, said control member disconnecting said electronic timing and switching circuit from said power source for the duration of time that B exposures of or T exposures are carried out and a contact switch associated with said electronic timing and switching circuit; and a contact lever acting on said contact switch when said push button is actuated, and decoupling said push button from said switching means, said contact lever being associated with said control member in form of a control lever, and being conveyable into a position where said contact lever is inoperative with respect to said push button and said contact switch.

2. The photographic camera of claim 1 characterized by a connecting rod having a projection for actuating said switching means when said contact lever is in the inoperative position, a first spring maintaining one end of said connecting rod in contact with a projection on said push button, and angle lever connected to the other end of said connecting rod, and a second spring for maintaining said angle lever engaged with said shutter blade system.

3. The photographic camera of claim 2 wherein said switching means comprises two switches electrically connected to said power source and to said electromagnet, said switches being capable of alternate actuation by said push button.

4. The photographic camera of claim 3 wherein the first of said switches is fixed and the second of said switches is situated on said control lever and can be conveyed into two positions relative to said first switch, said switches being capable of influence in one direction by said projection of said connecting rod when said switches are in one of said relative positions, and said switches being capable of influence in the opposite direction by said projection of said connecting rod when said switches are in the other of said relative positions.

5. The camera of claim 3 wherein said two switches are fixed in place and the actuating member of the first of said switches is oriented with respect to the actuating member of the second of said switches so that said switches can be influenced either in the same direction or in opposite directions by the projection of said connecting rod.

6. A photographic camera having a shutter blade system covering the lens aperture and executing a reciprocating motion during the exposure process, an exposure time setting member, a push button for releasing the camera, an electromagnet the polarity of which is reversible by means of an electronic timing and switching circuit, a contact switch associated with said circuit for energizing said electromagnet, said contact switch being operated by said push button, and a permanent magnet associated with said electromagnet and being situated on said shutter blade system and participating in the motion of said shutter blade system, characterized by: a contact lever acting on said contact switch when said push button is actuated; a switching means for carrying out B exposures and T exposures, said switching means cooperating with said push button; a power source for energizing said electromagnet; a connecting rod having a projection for actuating said switching means when said contact lever is in the inoperative position, said connecting rod being held in contact with a projection of said push button by means of a spring; an angle lever connected to said connecting rod and being held in contact with said shutter blade system by means of a spring; and a control member associated with said switching means and said exposure time setting member, said member releasing said switching means after said camera is switched to the B or T setting positions marked on said exposure time setting member.